July 31, 1962 — R. L. SIMPSON — 3,047,019
CURTAIN VALVE

Filed June 3, 1960 — 2 Sheets-Sheet 1

INVENTOR.
ROBERT L. SIMPSON
BY Teller & McCormick
ATTORNEYS

United States Patent Office 3,047,019
Patented July 31, 1962

3,047,019
CURTAIN VALVE
Robert L. Simpson, Farmington, Conn.
(R.F.D. 1, Elmwood, Conn.)
Filed June 3, 1960, Ser. No. 33,845
9 Claims. (Cl. 137—625.28)

This invention relates to valves and, more particularly, to valves of the type which include a flexible valve member.

It is the general object of the invention to provide a valve of the type mentioned which is characterized by simplicity of construction, a high degree of efficiency of operation, and a high degree of durability and dependability in use.

A more specific object of the invention is to provide a valve of the type mentioned wherein fluid pressure forces assist in opening and closing movements of the flexible valve member with the result that a minimum of force is required for manual or other valve member actuation.

Another specific object of the invention is to provide a valve of the type mentioned wherein relative sliding movement between the flexible valve member and a valve seat is provided for whereby to effect a wiping action for removal of scale or other foreign mateer deposited on the valve seat.

Still another specific object of the invention is to provide a valve of the type mentioned wherein the flexible valve member serves to prevent a reversal of fluid flow through the valve when the member is in the open position, the valve thus serving a dual function as a shutoff valve and a check valve.

A still further specific object of the invention is to provide a valve of the type mentioned wherein a flexible member and a connected actuator are constructed and arranged in such manner that the valve can accommodate extreme temperature changes, considerable overtravel of its actuator, and substantial wear of its seating surfaces without detrimental effect on the valve's operation.

A still further specific object of the invention is to provide a valve of the type mentioned wherein a rotary valve actuator is provided and adapted for rotation in either a clockwise or counterclockwise direction for opening and closing movements of the valve member, opening and closing movements of the valve member being effected either by successive rotary movements of the actuator in one direction or by successive rotary movements of the actuator in opposite directions.

The drawings show three embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Figure 1:
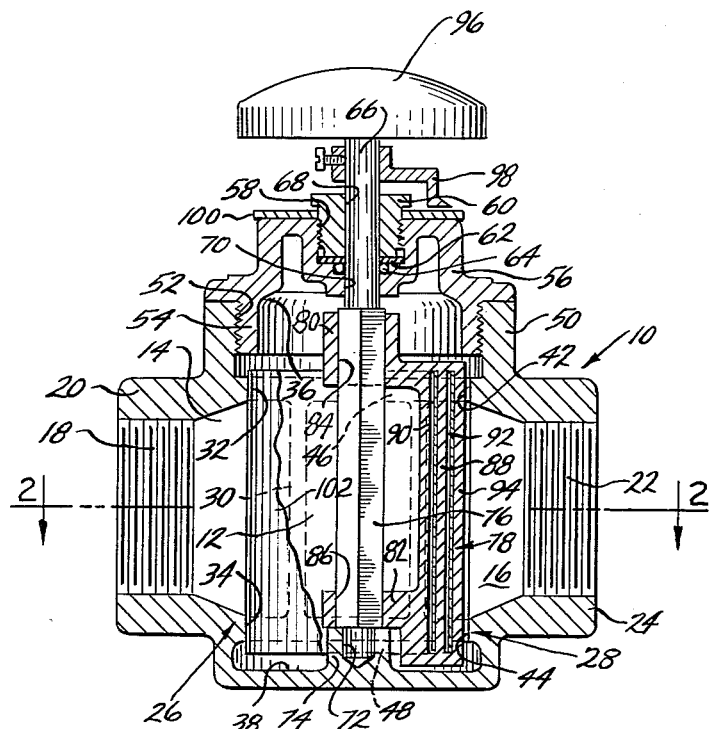
FIG. 1 is a vertical longitudinal section through a valve embodying the invention.

A valve embodying the present invention comprises a housing as indicated generally at 10 which may take a variety of forms, but which is preferably cylindrical and integrally formed as by casting. A valve chamber 12 within the housing 10 is also preferably generally cylindrical and has first and second ports 14 and 16 which communicate therewith. As shown, the ports 14 and 16 communicate with the chamber 12 through opposite portions of the side wall thereof and said ports respectively constitute a discharge port and an inlet port for said chamber. The discharge port 14 communicates with a threaded bore 18 in a radial boss 20 adapted for connection with a suitable pipe or conduit not shown. The inlet port 16 communicates with a threaded bore 22 in a radial boss 24 adapted for connection with a suitable supply conduit or pipe not shown.

Figure 2:
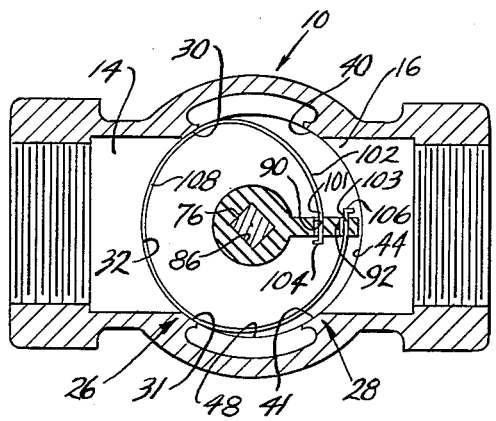
FIG. 2 is a horizontal longitudinal section taken as indicated by the line 2—2 in FIG. 1 and showing the flexible valve member in closed position.

In accordance with the presently preferred practice, the cross-sectional areas of the ports 14 and 16 are substantially larger than those of the connected conduits and narrow raised valve seats, as indicated generally at 26 and 28, are provided adjacent and around the peripheries of said ports. The seat 26 comprises parallel vertical and axially extending side portions 30 and 31 and upper and lower portions 32 and 34. The upper and lower seat portions 32 and 34 are similar and are partially circular as best shown in FIG. 2. Further, said seat portions are preferably spaced respectively from upper and lower end walls 36 and 38 of the valve chamber 12 as shown.

The valve seat 28 associated with the inlet port 16 is shown as being similar to the valve seat 26. Vertical and axially extending side portions 40 and 41 thereof join upper and lower portions 42 and 44 thereof at their ends. The upper and lower portions 42 and 44 of the seat 28 are similar and partially circular and are spaced respectively from the upper and lower end walls 36 and 38 of the valve chamber 12. As shown, the two upper seat portions 32 and 42 constitute diametrically opposite portions of an upper annular flange 46 which extends around and radially inwardly from the side wall of the valve chamber 12. Similarly, the lower seat portions 34 and 44 form diametrically opposite portions of a lower annular flange 48 which extends around and radially inwardly from the said chamber side wall.

At its upper end portion the valve housing 10 has an integrally formed and axially upwardly projecting boss 50 which has an axially extending threaded bore 52 therein. The bore 52 receives a threaded portion 54 of a bonnet or cap 56 which cooperates with the housing 10 to define the valve chamber 12. An axially extending threaded bore 58 in the bonnet or cap 56 receives a threaded plug 60 which engages and holds a ring 62 and an annular seal 64 in said bore 58 about an upper portion of an actuator stem 66. The said upper portion of the stem 66 is rotatable in aligned axial bores 68 and 70 formed respectively in the plug 60 and the bonnet or cap 56.

The actuator stem 66 extends vertically downwardly and axially in the valve chamber 12 from its said upper portion and its lower end portion is rotatably received in a suitable bore 72 formed in an integral axially upwardly projecting boss 74 on the bottom wall of the valve chamber 12. The aforesaid upper and lower end portions of the actuator stem 66 are both of circular cross section, as shown, but a central portion 76 thereof is of noncircular cross section and is preferably square as shown.

Mounted on the square central portion 76 of the actuator stem 66 is a radially extending actuator arm indicated generally at 78. The arm 78 has upper and lower bearing portions 80 and 82 provided with square openings 84 and 86 for receiving the central portion 76 of the actuator stem 66, and said arm also has a radially extending body portion 88. The said body portion 88 of the arm is provided with two radially spaced axially elongated slots 90 and 92. The purpose of the slots 90 and 92 will be set forth hereinafter.

From the foregoing, it will be apparent that the actuator stem 66 may be rotated manually or by other means to swing the arm 78 through 360° or a lesser angular distance in the valve chamber 12. The outer edge 94 of the body portion 88 of said arm is spaced from the side wall of the chamber 12 and from the aforementioned raised valve seats 26 and 28 to permit such movement of the arm. While the invention is not so limited, the valve shown is adapted for manual operation and a small handwheel 96 is connected to the actuator stem 66 at the upper end thereof for convenient rotation of the same. An indicator 98 may also be attached to the said upper end portion of the actuator stem 66 to indicate valve condition on a suitably marked dial 100 mounted on the cap or bonnet 56.

Disposed within the valve chamber 12 and adapted for opening and closing movements therein is a flexible valve member 102 best shown in FIG. 2. In accordance with the invention, the valve member 102 is constructed and arranged and disposed in the valve chamber 12 so as to close one of the aforesaid ports 14 and 16 communicating therewith. Further in accordance with the invention, the said valve member is connected with an actuator and the actuator is movable so as to flex the valve member and pull the same bodily away from said one port in a peeling motion whereby to progressively open the port. Preferably the peeling motion of the valve member is accompanied by a sliding movement of the member relative to a seat adjacent the said one port and such sliding movement results in the aforementioned wiping action on the seat surfaces.

In the preferred embodiment of the invention shown in FIGS. 1 through 5, the flexible valve member 102 comprises a rectangular sheet metal member of spring steel or the like which is substantially flat when at rest but which is rolled or bent into a generally spiral shape. As shown, opposite end portions 101 and 103 of the valve member 102 are slidably entered in the aforementioned slots 90 and 92 in the actuator arm 78 and project therethrough in opposite directions. Means comprising short lateral flanges 104 and 106 on said opposite end portions 101 and 103 of the valve member respectively prevent withdrawal of the end portions from their respective slots.

As shown in FIG. 2, an intermediate portion 108 of the valve member 102 engages the valve seat 26 and closes the discharge port 14 when the valve member is in its closed position. Fluid under pressure from the inlet port 16 in the valve chamber 12 acts on the inner surface of said intermediate portion 108 of the valve member to hold the same in engagement with the seat 26 and in closed position with respect to the discharge port 14. Also, the inherent spring force of the member 102 causes the member to expand into engagement with said seat 26 to close the said discharge port. A desirably high seating force effecting leakproof closing of the port is provided for by the aforementioned enlarged cross-sectional area of the port and the provision of the narrow raised valve seat 26 around said port.

Figure 3:
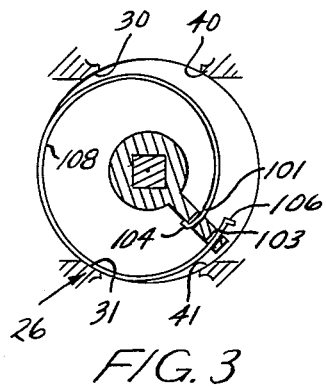
FIG. 3 is a fragmentary horizontal longitudinal section showing the flexible valve member in a partially open position.

In FIG. 3 the valve member 102 is shown in a partially open position, it being observed that the actuator arm 78 has been rotated in a clockwise direction through an angle of approximately 45° from the FIG. 2 position of said arm. As a result of such rotation of the arm 78, the flange 104 has been engaged by said arm and a peeling movement of the valve member 102 has commenced, the said member being thus pulled away from the side portion 30 of the seat 26. The opposite end portion 103 of the valve member 102 carrying the flange 106 has also been rotated in a clockwise direction indicating that some relative sliding movement between the valve member and the seat 26 has occurred. It is to be noted, however, that the said opposite end portion 103 of the valve member has moved through the slot 92 and has not been rotated through the full 45° angle. This results from the effect of the pressure forces on the inner surface of the intermediate portion 108 of the valve member which forces tend to inhibit sliding movement of said member relative to said seat.

Figure 4:
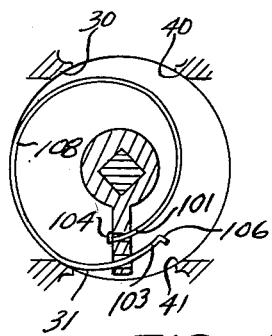
FIG. 4 is a fragmentary horizontal longitudinal section showing the flexible valve member further opened.

In FIG. 4 the actuator arm 78 is shown rotated through a 90° angle from its FIG. 2 position. The flange 104 on the valve member 102 has also been rotated through approximately 90° to hold the valve member in a further open position with respect to the discharge port 14. The flange 106 on the end portion 103, on the other hand, has been rotated through a greater angle than in FIG. 3 but through an angle substantially less than 90°. The end portion 103 of the valve member has been drawn radially inwardly toward the center of the valve chamber. Obviously, further clockwise rotation of the actuator arm 74 will result in movement of the valve member 102 away from the side portion 31 of the seat 26 and opening of the port 14 adjacent said seat portion.

Figure 5:
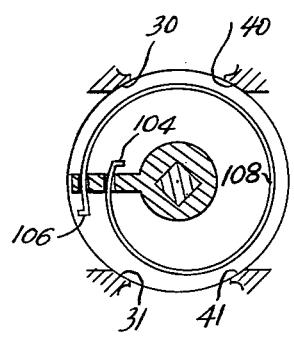
FIG. 5 is a fragmentary horizontal longitudinal section showing the flexible valve member in its fully open position.

In FIG. 5 the actuator arm 78 is shown 180° from the FIG. 2 position thereof. In this position of the actuator arm, the valve member 102 is disengaged completely from the seat 26 and is rotated bodily through approximately 180°. The impact pressure of the fluid entering the valve chamber 12 from the inlet port 16 acts on the aforementioned intermediate portion 108 of the valve member and slightly compresses said valve member to maintain said intermediate portion thereof out of engagement with the valve seat 28 adjacent the inlet port. This provides for the free entry of fluid from the inlet port 16 to the valve chamber 12 and for flow through said chamber to the discharge port 14.

Still referring to FIG. 5, it is to be observed that a reversal of flow through the valve is prevented when the valve member 102 is in the open position as shown. The change in pressure differential accompanying an impending flow reversal will result in a reduction of impact pressure on the said valve member and the member will expand into engagement with the seat 28 to close the inlet port 16. Thereafter, the pressure of fluid in the chamber 12 acting on the inner surface of the intermediate portion 108 of the valve member will serve to effect positive and leak tight sealing of the valve member with the seat 28.

Referring again to FIGS. 2 and 3 and reconsidering the initial opening movement of the valve member relative to the discharge port 14, the manner in which pressure forces assist in opening of the said port will be readily understood. With the valve member in the fully closed position of FIG. 2, a comparatively high seating force is provided by the pressure of fluid in the valve chamber 12 on the inner surface of the intermediate portion 108 of said member as stated above. As the actuator arm 78 is rotated toward the FIG. 3 position, however, only a small portion of the total seating force must be overcome to provide a crack opening adjacent the side portion 30 of the valve seat 26, it being observed that the peeling movement of the valve member makes it unnecessary to overcome the total seating force to provide such an opening. When the crack opening occurs, fluid flow therethrough causes a rapid pressure increase on the outer surface of said intermediate portion 108 of the valve member 102 and the seating force is immediately substantially reduced. Thus, further opening movement of the valve member requires only a nominal force exerted on the valve member by the actuator arm 78.

In closing the discharge port 14, the valve member 102 is rotated from the FIG. 5 position to the FIG. 2 position thereof. Assuming fluid flow through the valve chamber 12 from the inlet 16 to the discharge port 14, it will be seen that fluid pressure on the outer surface of the intermediate portion 108 of the valve member will be slightly lower than the pressure on the inner surface thereof. This pressure differential, in cooperation with the inherent spring force of the valve member which tends to expand the member, results in rapid and positive closing of the discharge port 14.

As stated above, it is presently preferred that relative sliding movement between the valve member 102 and the valve seat 26 be provided for and such sliding movement is provided for in the preferred embodiment of the invention shown in FIGS. 1 through 5. It will be apparent, however, that the amount or degree of sliding movement of the valve member 102 relative to the seat 26 may vary substantially and that valves embodying the invention may be constructed to provide for varying amounts or degrees of sliding movement. The factors affecting the amount or degree of sliding movement include the flexibility of the valve member 102, the manner in which the valve member is connected to its actuator, and the type of motion imparted to the valve member by the actuator. It is within the scope of the invention to provide for subsantially no sliding movement of the valve member 102 relative to the seat 26, as well as to provide for varying degrees of sliding movement.

Referring again particularly to FIG. 2, it will be observed that the flanges 104 and 106 are each spaced from the actuator arm 78. Such a construction is preferred and as a result of such spacing of the flanges and the flexibility of the valve member 102, the valve member can accommodate substantial overtravel. That is, the actuator arm 78 need not be moved to the exact position shown in FIG. 2 in order to permit the valve member 102 to engage the valve seat 26 and close the port 14. If there is a slight overtravel, or a slight undertravel, the inherent spring force of the valve member and the fluid pressure on the inner surface thereof will result in positive and tight closing of the port. It is to be observed also that expansion and/or contraction of the valve member, as may result from changes in the temperature of the fluid, can be accommodated without loss of the positive and tight closing action of the valve member. Similarly, wear of the valve seat 26 can be compensated for by a slight additional expansion of the valve member.

While the opening and closing movements of the valve member have been described above as effected by clockwise rotation of the actuator stem and arm, it will be apparent that opening and closing movements of the valve member can also be effected by counterclockwise rotation of said elements. The actuator arm 78 may be rotated through 180° in one direction to open or to close the valve, and may thereafter be rotated through an additional 180° in the same direction, or through 180° in the opposite direction, to reverse valve member position.

Figure 6:
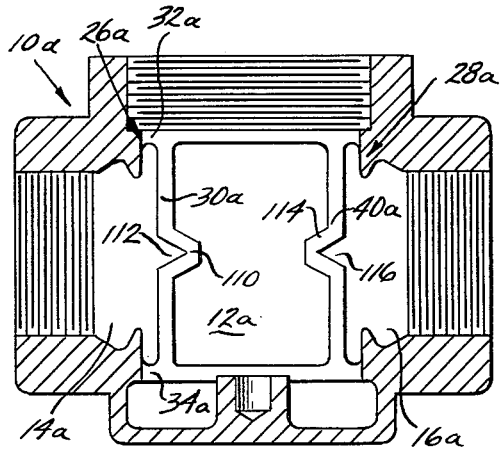
FIG. 6 is a vertical longitudinal section through a valve housing forming a part of a valve which constitutes an alternative embodiment of the invention.

Referring now to FIG. 6, it will be observed that a valve housing 10a therein has a valve chamber 12a therein and defines inlet and outlet ports 16a and 14a. A valve seat indicated generally at 26a around the outlet port 14a has upper and lower partially circular portions 32a and 34a and side portions 30a and 31a (one shown) opposite each other. Each of the side portions 30a and 31a of the valve seat has a generally V-shaped section 110 which defines a small V-shaped portion 112 of the port 14a. As shown, the valve also includes a seat 28a about the inlet port 16a which has side portions 40a and 41a provided with similar V-shaped sections 114 defining V-shaped pilot portions 116 of the inlet port.

The pilot portions 112 and 116 of the ports 14a and 16a provide for a gradual initial introduction of fluid from the chamber 12a to their respective ports during opening movement of the valve chamber relative to the ports. That is, when a valve member, such as the member 102, is peeled from the seat portion 30a as in FIG. 3, the fluid in the chamber 12a is permitted to flow through the pilot portion 112 prior to opening of the main portion of the port 14a and this reduces the force required to provide a crack opening of the port 14a adjacent the side portion 30a of the seat 26a. Similar action takes place at the pilot portion 116 when the port 16a is used as a discharge port with fluid flow through the valve in a direction opposite to that described above for FIGS. 1 through 5. It may be desirable in certain high pressure installations to provide for the pilot action obtained with the alternative valve construction of FIG. 6 in order to avoid valve chatter.

Figure 7:
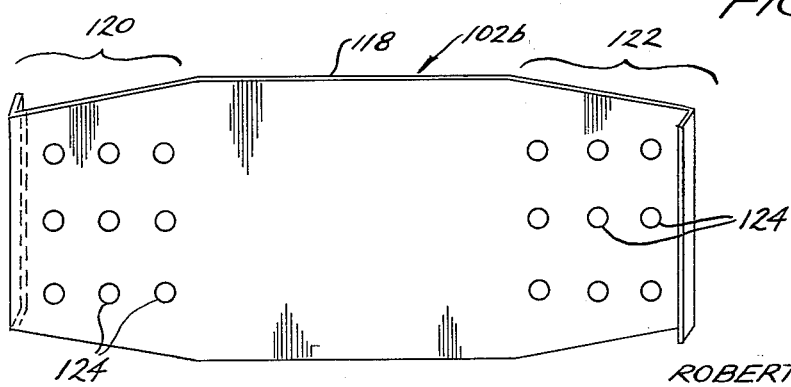
FIG. 7 shows a flexible valve member forming a part of a valve which constitutes a second alternative embodiment of the invention.

In FIG. 7 a valve member 102b is shown. The said valve member forms a part of a valve which constitutes a second alternative embodiment of the invention and which may be identical with the valve shown in FIGS. 1 through 5 except for the construction of the valve member. The valve member 102b has an intermediate portion 118 which is adapted to cover and close a port such as the port 14 when the valve member is held in the position of the valve member 102 in FIG. 2. Adjacent said intermediate portion 118, the valve member has end portions 120 and 122 which permit fluid flow through a valve port when they are disposed adjacent the port and in engagement with the seat associated with the port. Said end portions 120 and 122 may be constructed in various ways to provide for such fluid flow but as shown, they are each provided with a plurality of flow openings 124, 124 and their width is gradually decreased toward the ends of the valve member to provide for fluid flow over and under the member adjacent the upper and lower portions of a valve seat such as the seat 26.

Under high pressure conditions, a valve member such as the member 102 may cause chatter during opening. As the member is initially peeled from the side portion 30 of the valve seat 26 as in FIG. 3, there may be sufficient sliding movement of the valve member in a clockwise direction to permit a degree of relaxation of the member and this may result in chatter or rapid opening and closing movements of the member relative to said seat side portion. Similar peeling and sliding movement of a valve member such as the member 102b will move the inner part of the end portion 120 of said member past the side portion 31 of the valve seat 26 and additional fluid flow through at least some of the openings 124, 124 and over and under the said end portion will occur. It has been found that such additional flow serves to reduce pressure within the valve chamber and on the valve member with the result that valve chatter is substantially reduced if not completely eliminated even though the aforesaid relaxation of the valve member does occur. Thus, highly efficient high pressure operation of the valve may be achieved with a valve member such as the member 102b.

Figure 8:
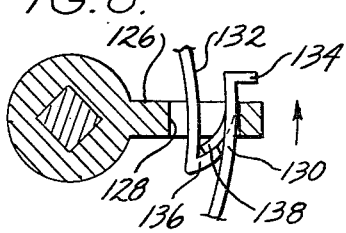
FIG. 8 is an enlarged fragmentary sectional view through a rotary actuator and connected end portions of an associated valve member in another alternative embodiment of the invention.

In FIG. 8 an alternative connection of a valve member with an actuator is shown and it will be observed that such alternative connection may be effected with a valve member of either of the above-described types including the members 102 and 102b. A rotary actuator having an arm 126 similar to the arm 78 of the above-described actuator is provided with a single axially elongated slot 128 which loosely receives opposite end portions 130 and 132 of a valve member such as the members 102 and 102b. The end portion 130 of the valve member is provided with a lateral flange 134 which is adapted to be engaged by the actuator arm 126 when the latter is rotated in a counterclockwise direction and the end portion 132 of said member has a lateral and bent back flange 136 which is interengaged with a bent back ear 138 on the aforesaid end portion 130.

Engagement of the actuator arm 126 with the flange 134 and counterclockwise rotation of said arm results in peeling movement of the valve member away from a valve port as described above for the valve members 102 and 102b and the actuator arm 78. The flange 136 and the ear 138, on the other hand, serve merely to retain the end portion 132 of the valve member in the slot 128 and do not provide for opening movement of the valve member in response to clockwise rotation of the actuator arm 126. Thus, it will be seen that a valve constructed in accordance with the FIG. 8 embodiment of the invention will be substantially identical with the valve of FIGS. 1 through 5 in construction and operation, but it will be adapted for operation in response to unidirectional movement of its handwheel only.

The invention claimed is:

1. In a valve, the combination of a housing having a generally cylindrical valve chamber therewithin which communicates with discharge and inlet ports in opposite portions of its side wall, a rotary actuator in said valve chamber with a generally radial arm provided with two axially elongated and radially spaced slots, and a generally spiral flexible valve member in said chamber with opposite end portions entered respectively in said slots and projecting therethrough in opposite directions, each of said opposite end portions of said member being provided with means for preventing withdrawal of the end portion from its slot and an intermediate portion of said valve member being disposed adjacent said discharge port and acted on by fluid from said inlet port to close said discharge port, said means being engageable selectively by said radial arm on said actuator on rotation of said actuator in one or an opposite direction whereby said intermediate portion of said valve member can be selectively pulled away from opposite sides of said discharge port in a peeling motion to progressively open the said port.

2. The combination set forth in claim 1 wherein said valve member and actuator are constructed and arranged to provide for sliding motion of the valve member relative to the discharge port and for peeling of the valve member first from one side and thereafter from an opposite side of said port upon rotation of said actuator arm in one or an opposite direction.

3. The combination set forth in claim 1 wherein said discharge port is connectible with a conduit having a cross-sectional area substantially smaller than that of the port and wherein a narrow raised valve seat is provided around the periphery of said port.

4. The combination set forth in claim 1 wherein each of said ports has a narrow raised valve seat around its periphery and wherein said actuator is rotatable from one position to another to move said intermediate portion of said valve member adjacent said ports and their respective seats selectively.

5. The combination set forth in claim 1 wherein the end portions of said valve member are slidable in their respective slots and wherein the means on each of said end portions comprises a laterally extending flange which is spaced from the radial arm of the actuator when the intermediate portion of said valve member is positioned to close said discharge port.

6. In a valve, the combination of a housing having a generally cylindrical valve chamber therewithin which communicates with discharge and inlet ports in opposite portions of its side wall, a rotary actuator in said valve chamber with a generally radial arm provided with two axially elongated and radially spaced slots, and a flexible sheet metal valve member of generally spiral shape in said chamber with opposite end portions thereof slidably entered respectively in said slots and projecting therethrough in opposite directions, said opposite end portions each being provided with a laterally extending flange which is spaced from the radial arm and which prevents withdrawal of the associated end portion from its slot and an intermediate portion of said valve member being disposed adjacent said discharge port and acted on by fluid from said inlet port to close said discharge port, said flanges being engageable selectively by said radial arm on said actuator on rotation of said actuator in one or an opposite direction whereby said intermediate portion of said valve member can be selectively pulled away from opposite sides of said discharge port in a peeling motion to progressively open the said port.

7. The combination set forth in claim 1 wherein opposite sides of said discharge port include pilot portions which are opened prior to the opening of the remaining portion of said port during the said peeling motion of said valve member.

8. The combination set forth in claim 2 wherein said flexible valve member has end portions adjacent its said intermediate portion which permit fluid flow through a valve port when they are positioned adjacent the port.

9. In a valve, the combination of a housing having a generally cylindrical valve chamber therewithin which communicates with a discharge port in its side wall and with an inlet port, a rotary actuator in said valve chamber with a generally radial arm provided with an axially elongated slot, and a generally spiral flexible sheet metal valve member in said chamber with opposite end portions thereof entered in said slot, one of said end portions being provided with a lateral flange and with an ear and the other of said end portions being provided with a lateral flange interengaged with said ear to hold said other end portion in said slot, an intermediate portion of said valve member being disposed adjacent said discharge port so as to be acted on by fluid from said inlet port to close said discharge port, and said flange on said one end portion of said valve member being engageable with said radial arm on said actuator on rotation of said actuator whereby to pull said intermediate portion of said valve member away from said discharge port in a peeling motion.

References Cited in the file of this patent

UNITED STATES PATENTS

| | | |
|---|---|---|
| 2,649,275 | Noyes | Aug. 18, 1953 |
| 2,700,529 | Svenson | Jan. 25, 1955 |
| 2,784,740 | Stageberg | Mar. 12, 1957 |
| 2,845,248 | Fuglie | July 29, 1958 |